(12) United States Patent
Nakano et al.

(10) Patent No.: US 7,628,076 B2
(45) Date of Patent: Dec. 8, 2009

(54) ULTRASOUND SENSOR

(75) Inventors: Akio Nakano, Anjo (JP); Muneaki Matsumoto, Okazaki (JP)

(73) Assignee: Denso Corporation, Kariya (JP)

( * ) Notice: Subject to any disclaimer, the term of this patent is extended or adjusted under 35 U.S.C. 154(b) by 454 days.

(21) Appl. No.: 11/605,399

(22) Filed: Nov. 29, 2006

(65) Prior Publication Data
US 2007/0163350 A1 Jul. 19, 2007

(30) Foreign Application Priority Data
Dec. 8, 2005 (JP) .............................. 2005-355330

(51) Int. Cl.
*G01N 29/04* (2006.01)
(52) U.S. Cl. .............................. 73/643; 73/632; 73/649; 73/702
(58) Field of Classification Search .................. 73/632, 73/649, 702, 12.12, 643
See application file for complete search history.

(56) References Cited

U.S. PATENT DOCUMENTS

| | | | | |
|---|---|---|---|---|
| 4,524,356 A | * | 6/1985 | Kodera et al. ............... | 340/904 |
| 4,636,997 A | * | 1/1987 | Toyama et al. ............... | 367/140 |
| 5,059,546 A | * | 10/1991 | Havemann ................... | 257/378 |
| 6,759,950 B2 | * | 7/2004 | Nishimoto et al. .......... | 340/436 |
| 7,246,523 B2 | * | 7/2007 | Magane et al. ................ | 73/649 |
| 7,403,102 B2 | * | 7/2008 | Fukuda et al. ............... | 340/435 |
| 2006/0103512 A1 | * | 5/2006 | Fukuda et al. ............... | 340/435 |
| 2006/0284515 A1 | * | 12/2006 | Nakajima ................... | 310/311 |
| 2007/0024431 A1 | * | 2/2007 | Touge ......................... | 340/436 |

FOREIGN PATENT DOCUMENTS

| | | |
|---|---|---|
| GB | 2 272 819 | 5/1994 |
| JP | 62-240890 | 10/1987 |
| JP | 5-74099 | 10/1993 |
| JP | 10-123236 | 5/1998 |

* cited by examiner

*Primary Examiner*—J M Saint Surin
(74) *Attorney, Agent, or Firm*—Nixon & Vanderhye, PC

(57) ABSTRACT

An ultrasound sensor has an ultrasound oscillator which is expandable and contractible in a thickness direction thereof, and a casing which houses therein the ultrasound oscillator. An outer surface of an end portion of the casing is fixed to a mounting member. The side surface of the ultrasound oscillator has at least one of a protrusion portion, a concave portion and an inclined portion, through which one of two end surfaces of the ultrasound oscillator fixedly contacts an inner surface of the end portion of the casing. The side surface of the ultrasound oscillator is substantially parallel with the thickness direction thereof.

13 Claims, 4 Drawing Sheets

ULTRASOUND SENSOR

CROSS REFERENCE TO RELATED APPLICATION

This application is based on a Japanese Patent Application No. 2005-355330 filed on Dec. 8, 2005, the disclosure of which is incorporated herein by reference.

FIELD OF THE INVENTION

The present invention relates to an ultrasound sensor. The ultrasound sensor can be suitably used for a vehicle to detect an obstacle around the vehicle, for example.

BACKGROUND OF THE INVENTION

Generally, an obstacle detection device for a vehicle can be provided with an ultrasound oscillator. For example, as disclosed in JP-62-240890A, a vibration surface of the ultrasound oscillator fixedly contacts a predetermined portion of a back surface (vehicle inner side surface) of a vehicle bumper by bonding through an adhesive. Thus, the vibration surface of the ultrasound oscillator is integrated with the back surface of the bumper. Therefore, the bumper (including a contact surface thereof which contacts vibration surface of ultrasound oscillator) is partially used as a vibration member, so that ultrasound from the ultrasound oscillator is transferred to the exterior of the vehicle.

In this case, an opening end of a protection casing is fixed to the back surface of the bumper, in such a manner that the ultrasound oscillator which is fixed to the back surface of the bumper is covered by the protection casing. That is, the ultrasound oscillator is housed in the casing to be protected.

An ultrasound oscillator which is expandable contractible in a diametric direction thereof (i.e., direction which is parallel to back surface of bumper) can be used. In this case, when the ultrasound oscillator diametrical-direction expands/contracts, there will occur a distortion at the contact surface (which contacts ultrasound oscillator) of the back surface of the bumper because the surrounding of the ultrasound oscillator is fixed via the protection casing.

Thus, the vibration of the ultrasound oscillator is transferred to a broad range of the bumper from the contact surface of the bumper due to the distortion. Therefore, ultrasound is sent from the broad range of the bumper surface. Accordingly, the directivity of ultrasound which is sent is inhomogeneous and has peak and dip, so that an obstacle around the vehicle cannot be detected stably.

On the other hand, an ultrasound oscillator which is expandable/contractible in a thickness direction thereof (i.e., direction which is perpendicular to back surface of bumper) can be also used. In this case, it is capable to restrict the vibration of the ultrasound oscillator from being transferred to the broad range of the bumper and obtain a desirable directivity. The frequency of ultrasound from the ultrasound oscillator (thickness oscillator) is determined by the thickness thereof. That is, the ultrasound frequency will become low with an increase of the thickness of the ultrasound oscillator (i.e., become high with decrease of thickness).

When the thickness oscillator is used to detect the obstacle around the vehicle, it is desirable that the directivity of the thickness oscillator is wide. Thus, it is necessary to lower the ultrasound frequency (that is, increase thickness of thickness oscillator).

However, when the thickness of the thickness oscillator is increased, the weight of the thickness oscillator will increase.

Therefore, it is difficult to make the thickness oscillator tightly contact the back surface of the bumper only by bonding through the adhesive. In this case, the vibration of the thickness oscillator is not substantially transferred to the back surface of the bumper.

SUMMARY OF THE INVENTION

In view of the above-described disadvantage, it is an object of the present invention to provide an ultrasound sensor, where vibration of an ultrasound oscillator can be substantially transferred to a mounting member, for example, a periphery member of a vehicle.

According to the present invention, an ultrasound sensor has an ultrasound oscillator which is expandable and contractible in a thickness direction thereof, and a casing which houses therein the ultrasound oscillator. An outer surface of an end portion of the casing fixedly contacts a mounting member. The ultrasound oscillator has at least one of a protrusion portion, a concave portion and an inclined portion, through which one of two end surfaces of the ultrasound oscillator fixedly contacts an inner surface of the end portion of the casing. The protrusion portion protrudes outwards from a side surface of the ultrasound oscillator. The concave portion is recessed from the side surface. The inclined portion is arranged at the side surface and inclined with respect to the thickness direction of the ultrasound oscillator. The two end surfaces of the ultrasound oscillator intersect the thickness direction of the ultrasound oscillator. The side surface of the ultrasound oscillator is substantially parallel with the thickness direction.

In this case, the ultrasound oscillator (thickness-direction expandable/contractible) is housed in the casing, and the end portion of the casing fixedly contacts the mounting member, for example, a vehicle inner side surface of a periphery member of a vehicle. Thus, in the case where the ultrasound oscillator is relatively weight, the contact area is increased as compared with the case where the vibration surface of the ultrasound oscillator directly contacts the vehicle periphery member.

In this case, the side surface (substantially parallel with thickness direction) of the ultrasound oscillator is provided with the construction (at least one of protrusion portion, concave portion and inclined portion) for fixing the ultrasound oscillator to the end portion of the casing in tight contact therewith. Thus, the one end surface of the ultrasound oscillator can fixedly contact the end portion of the casing.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENT

First Embodiment

An ultrasound sensor 10 according to a first embodiment of the present invention will be described with reference to FIGS. 1-3B. The ultrasound senor 10 can be suitably used for a vehicle, for example. In this case, the ultrasound sensor 10 can be attached to an inner surface (which is positioned at a vehicle inner side) of a periphery member (e.g., chassis member and bumper) of the vehicle.

Figure 1:
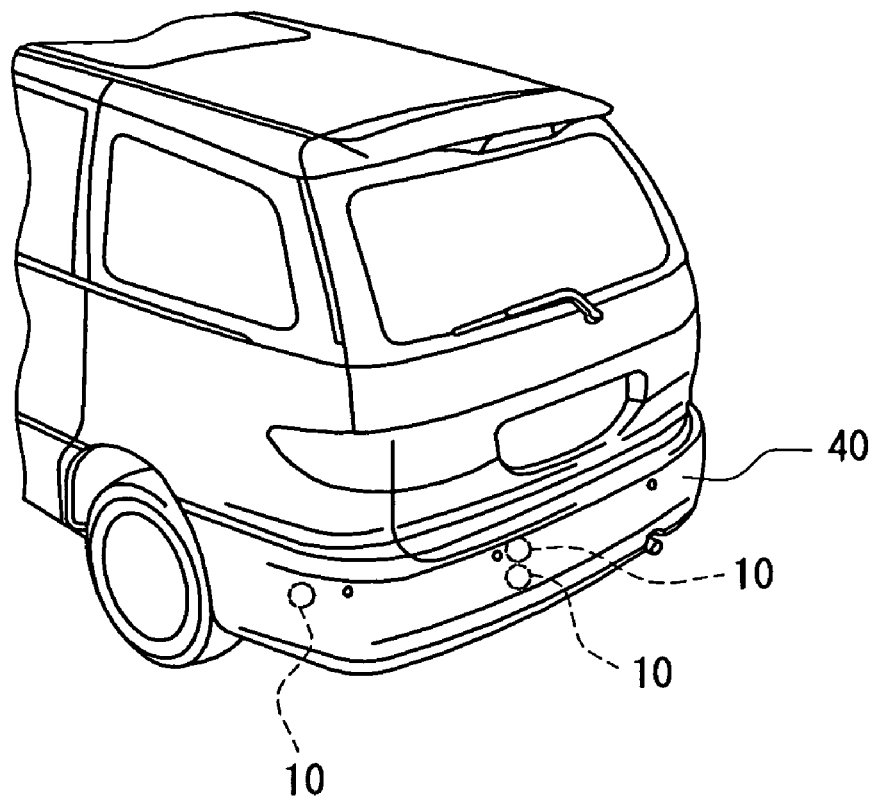
FIG. 1 is a schematic view showing an arrangement of ultrasound sensors at a bumper of a vehicle when being viewed from a vehicle outer side according to a first embodiment of the present invention.
Figure 2:
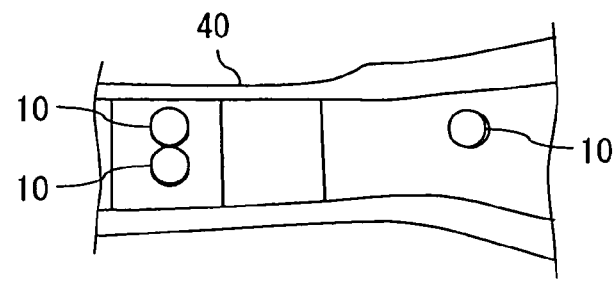
FIG. 2 is a schematic view showing the arrangement of the ultrasound sensors at the bumper of the vehicle when being viewed from a vehicle inner side according to the first embodiment.

For example, as shown in FIGS. 1-2, the vehicle can be provided with the multiple (e.g., three) ultrasound sensors 10, which are mounted to the inner surface of a bumper 40 (e.g., rear bumper) of the vehicle to detect an obstacle around the vehicle (e.g., obstacle at vehicle rear side) and determine a distance between the obstacle and the vehicle.

In this case, for example, the corner portion of the bumper 40 can be provided with the one ultrasound sensor 10, so that the obstacle near the corner portion can be detected. The back portion of the bumper 40 can be provided with the two ultrasound sensors 10 (which can be set to respectively send receive ultrasound, for example), so that the obstacle near the back portion can be detected.

Next, the construction of the ultrasound sensor 10 will be described.

Figure 3A:
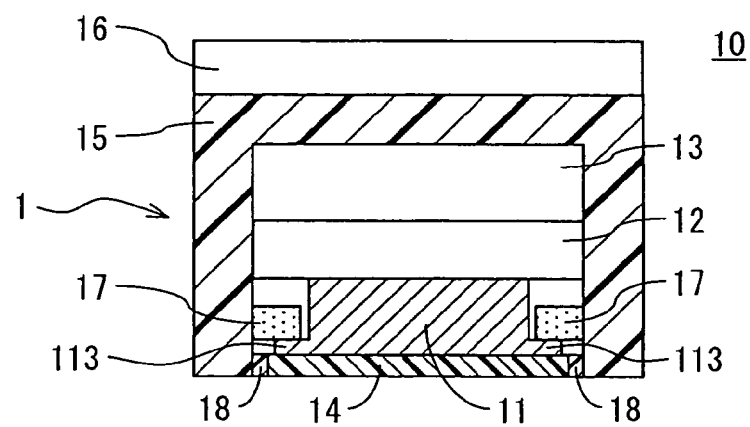
FIG. 3A is a partially longitudinal sectional view showing the ultrasound sensor according to the first embodiment.

As shown in FIG. 3A, the ultrasound sensor 10 includes an ultrasound oscillator 11, a sound absorbing member 12, a circuit member 13, a fixing member 17, and a casing 1 which houses therein the ultrasound oscillator 11, the sound absorbing member 12, the circuit member 13, and the fixing member 17. Moreover, the ultrasound sensor 10 can also have a connector member 16 which is attached to the exterior of the casing 1, for example.

The casing 1 has a housing portion 15 which has a substantial cup shape to define therein a space for housing the ultrasound oscillator 11 and the like, and an end portion 14 which is fixed to an opening end of the housing portion 15 to close the space. The housing portion 15 and the end portion 14 can be constructed of a same material, or different materials.

In this case, an elastic member 18 which is made of an elastic material such as a rubber is arranged around the end portion 14, to be engaged with both the side surface of the end portion 14 and the inner surface of the housing portion 15. That is, the end portion 14 is engaged with the housing portion 15 through the elastic member 18. Therefore, the restriction of the vibration from the ultrasound oscillator 11 by the housing portion 15 can be prevented. The end portion 14 and the elastic member 18 substantially close the space defined in the housing portion 15.

The ultrasound oscillator 11 is expandable and contractible in a thickness direction thereof (i.e., direction which is perpendicular to inner surface of bumper 40). For example, the ultrasound oscillator 11 can be constructed of a piezoelectric ceramic material such as PZT (lead zirconate titanate) and have a substantially column (e.g., circular plate) shape.

The one (e.g., lower surface) of two end surfaces of the ultrasound oscillator 11 is fixed to an inner surface of the end portion 14 of the casing 1. The end surfaces of the ultrasound oscillator intersect the thickness direction (which is parallel to central axis direction thereof) of the ultrasound oscillator 11. An outer surface of the end portion 14 can fixedly contact a mounting member such as the inner surface of the bumper 40.

Figure 3B:
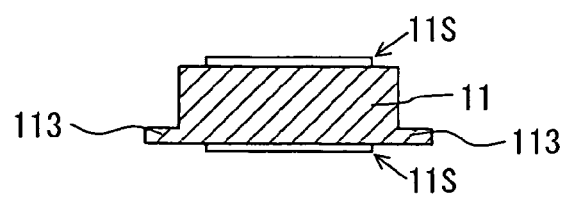
FIG. 3B is a partially sectional view showing electrodes of an ultrasound oscillator according to the first embodiment.

As shown in FIG. 3B, two electrodes 11s can be respectively arranged at the two end surfaces of the ultrasound oscillator 11. Voltage signal with a high frequency from the circuit member 13 can be applied to the ultrasound oscillator 11 through the electrodes 11s, so that the ultrasound oscillator 11 is deformed (i.e., expands and contracts) in the thickness direction thereof (e.g., up-down direction in FIG. 3A) to vibrate. Thus, the end portion 14 will be vibration-excited, so that ultrasound is sent toward the exterior of the casing 1.

The ultrasound oscillator 11 has a flange portion 113 (protrusion portion) which protrudes outwards from the side surface (which is substantially parallel to thickness direction thereof) of the ultrasound oscillator 11. The flange portion 113 can be formed along the whole circumference of the side surface. Alternatively, the flange portion 113 can be also formed along a part of the circumference of the side surface.

The thickness of the flange portion 113 is smaller than that of the ultrasound oscillator 11, so that the thickness-direction deformation of the flange portion 113 can be reduced.

The electrodes 11s which are respectively arranged at the two end surfaces of the ultrasound oscillator 11 are positioned near the central axis of the ultrasound oscillator 11. Thus, the strength of the electric field at the flange portion 113 can be reduced.

The sound absorbing member 12 is stacked at the other (e.g., upper surface) of the two end surfaces of the ultrasound oscillator 11 to absorb ultrasound from the upper surface of the ultrasound oscillator 11. The circuit member 13 generates the high-frequency voltage signal for vibration-exciting the ultrasound oscillator 11. The connector member 16 constructs a connector of a power cord or a signal line.

The casing 1 can be constructed of a synthetic resin, for example. The casing 1 houses therein the ultrasound oscillator 11, the sound absorbing member 12, the circuit member 13 and the like. The outer surface of the end portion 14 is fixed in tight contact with the inner surface of the bumper 40.

The fixing member 17 is fixed to the inner side of the housing portion 15, in such a manner that the fixing member 17 contacts the upper surface of the flange portion 113. Thus, the flange portion 113 of the ultrasound oscillator 11 is sandwiched between the inner surface of the end portion 14 and the fixing member 17.

Therefore, the lower surface of the ultrasound oscillator 11 is fixed in tight contact with the inner surface of the end portion 14, by the fixing member 17 and the flange portion 113 which contact each other. In this case, the fixing member 17 can be arranged so that the lower surface of the ultrasound oscillator 11 is pressed against the inner surface of the end portion 14.

According to this embodiment, the ultrasound oscillator 11 of the ultrasound sensor 10 fixedly contacts the end portion 14 via the flange portion 113 arranged at the side surface of the ultrasound oscillator 11. That is, the lower surface of the ultrasound oscillator 11 is fixed in tight contact with the inner surface of the end portion 14 of the casing 1 through the flange portion 113 which is sandwiched between the fixing member 17 and the end portion 14. Therefore, the vibration of the ultrasound oscillator 11 can be sufficiently transferred to the inner surface of the periphery member of the vehicle or the like.

Second Embodiment

A second embodiment of the present invention will be described with reference to FIGS. 4A and 4B. In the above-described first embodiment, the flange portion 113 which protrudes from the side surface of the ultrasound oscillator 11 is sandwiched between the fixing member 17 and the inner surface of the end portion 14 of the casing 1. In this case, the fixing member 17 contacts the upper surface of the flange portion 113, and is fixed to the inner side of the housing portion 15 of the casing 1.

Figure 4A:
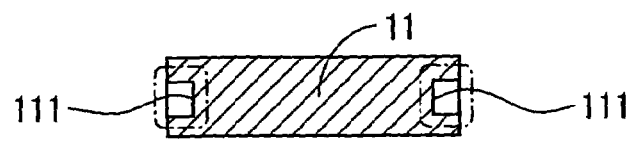
FIG. 4A is a sectional view showing an ultrasound oscillator according to a second embodiment of the present invention.

According to the second embodiment, as shown in FIG. 4A, the side surface of the ultrasound oscillator 11 is provided with a concave portion 111, which is recessed from the side surface. The concave portion 111 is engaged with the fixing member 17, which is fixed to the inner side of the housing portion 15 of the casing 1.

The concave portion 111 can be arranged along the whole circumference of the side surface of the ultrasound oscillator 11. Alternatively, the concave portion can be also arranged along a part of the circumference of the side surface of the ultrasound oscillator 11.

Figure 4B:
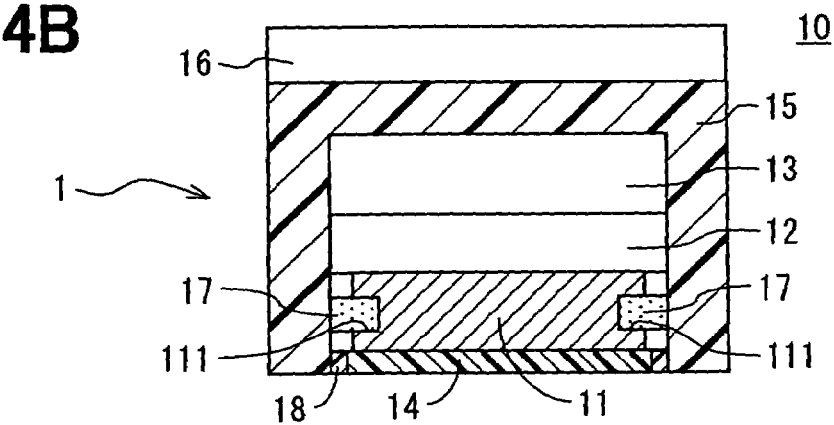
FIG. 4B is a partially longitudinal sectional view showing an ultrasound sensor according to the second embodiment.

As shown in FIG. 4B, the fixing member 17 can be fixed to the inner surface of the housing portion 15 after the fixing member 17 is engaged with the concave portion 111, in such a manner that the lower surface of the ultrasound oscillator 11 is in tight contact with (e.g., is pressed against) the inner surface of the end portion 14 of the casing 1.

Therefore, similarly to the first embodiment, the vibration of the ultrasound oscillator 11 can be sufficiently transferred to the inner surface of the periphery member of the vehicle or the like.

Third Embodiment

A third embodiment of the present invention will be described with reference to FIGS. 5A and 5B.

Figure 5A:
FIG. 5A is a sectional view showing an ultrasound oscillator according to a third embodiment of the present invention.

As shown in FIG. 5A, the ultrasound oscillator 11 is provided with a protrusion portion 112 which protrudes outwards from the side surface of the ultrasound oscillator 11. In this case, the protrusion portion 112 can be arranged at a halfway position in the thickness direction of the ultrasound oscillator 11.

The protrusion portion 112 can be formed along the whole circumference of the side surface of the ultrasound oscillator 11. Alternatively, the ultrasound oscillator 112 can be also formed along a part of the circumference of the side surface of the ultrasound oscillator 11.

Figure 5B:
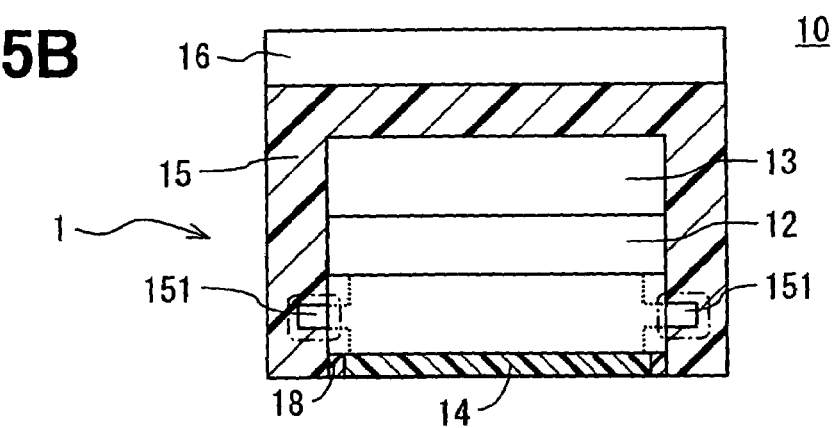
FIG. 5B is a partially longitudinal sectional view showing an ultrasound sensor according to the third embodiment.

In this case, as shown in FIG. 5B, the housing portion 15 has a recess portion 151 which is recessed from the inner surface of the housing portion 15. The protrusion portion 112 of the ultrasound oscillator 11 is engaged with the recess portion 151, in such a manner that the lower surface of the ultrasound oscillator 11 is in tight contact with the inner surface of the end portion 14.

Therefore, similarly to the first embodiment, the vibration of the ultrasound oscillator 11 can be sufficiently transferred to the inner surface of the periphery member of the vehicle or the like.

Fourth Embodiment

A fourth embodiment of the present invention will be described with reference to FIGS. 6A and 6B.

Figure 6A:
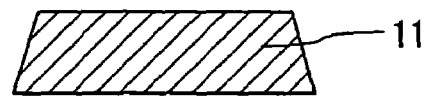
FIG. 6A is a sectional view showing an ultrasound oscillator according to a fourth embodiment of the present invention.

In this case, as shown in FIG. 6A, at least a part of the side surface of the ultrasound oscillator 11 is inclined with respect to the thickness direction of the ultrasound oscillator 11. That is, the side surface of the ultrasound oscillator 11 is provided with an inclined portion.

The inclined portion can be provided for the whole side surface of the ultrasound oscillator 11 in the circumference direction thereof. Alternatively, the inclined portion can be provided for a part of the side surface of the ultrasound oscillator 11 in the circumference direction thereof.

Figure 6B:
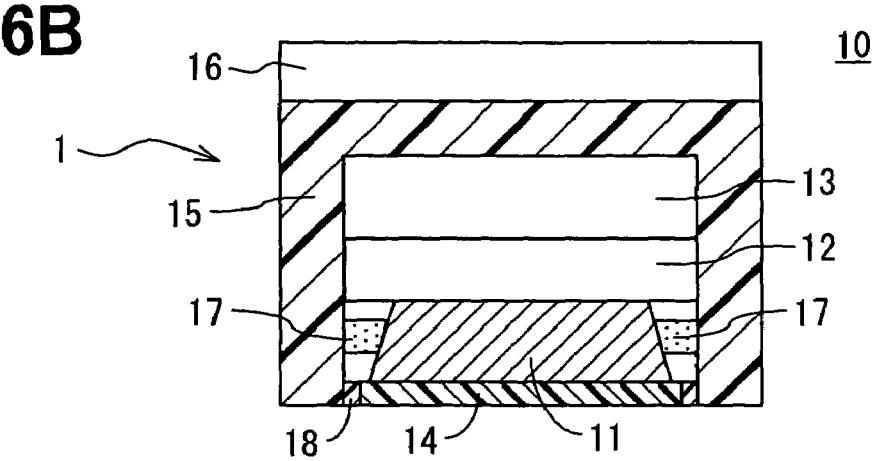
FIG. 6B is a partially longitudinal sectional view showing an ultrasound sensor according to the fourth embodiment.

With reference to FIG. 6B, the fixing member 17 is fixed to the inner surface of the housing portion 15 and contacts the inclined portion of the side surface of the ultrasound oscillator 11, in such a manner that the lower surface of the ultrasound oscillator 11 fixedly contacts the inner surface of the end portion 14.

In this case, as shown in FIGS. 6A and 6B, it is desirable that the inclined portion of the side surface of the ultrasound oscillator 11 is tapered from the side of the one end (e.g., lower end side) of the ultrasound oscillator 11 which contacts the end portion 14, toward the side of the other end (e.g., upper end side) of the ultrasound oscillator 11 which contacts the sound absorbing member 12 or the like.

That is, the upper side of the inclined portion is nearer the central axis of the ultrasound oscillator 11 than the lower side thereof does.

Thus, the deviation of the ultrasound oscillator 11 from the end portion 14 can be restricted by the fixing member 17. That is, the ultrasound oscillator 11 can be fixed via the tilt of the side surface of the ultrasound oscillator 11.

Figure 7A:
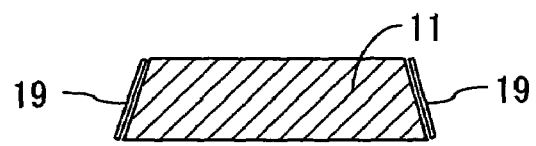
FIG. 7A is a partially sectional view showing an ultrasound oscillator according to a first modification of the fourth embodiment.

Referring to FIG. 6B, the inclined portion of the side surface of the ultrasound oscillator 11 can directly contact the fixing member 17. However, according to a first modification of the fourth embodiment, as shown in FIG. 7A, a sound absorbing member 19 such as a rubber sheet can be also arranged between the inclined portion of the ultrasound oscillator 11 and the fixing member 17. Thus, the leakage of sound through the inclined portion can be restricted by the sound absorbing member 19.

Figure 7B:
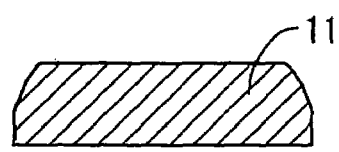
FIG. 7B is a sectional view showing an ultrasound oscillator according to a second modification of the fourth embodiment.

Moreover, according to a second modification of the fourth embodiment, as shown in FIG. 7B, the inclined portion of the side surface of the ultrasound oscillator 11 can also have a curved shape in a cross sectional view of the ultrasound oscillator 11, which is taken along the thickness direction of the ultrasound oscillator 11. That is, the side surface of the ultrasound oscillator 11 which is inclined can be also a curved surface.

In this case, similarly, it is desirable that the inclined portion of the side surface of the ultrasound oscillator 11 is tapered from the side of the one end of the ultrasound oscillator 11 which contacts the end portion 14, toward the side of the other end of the ultrasound oscillator 11. Thus, the deviation of the ultrasound oscillator 11 from the end portion 14 of the casing 1 can be restricted by the fixing member 17.

Other Embodiment

Although the present invention has been fully described in connection with the preferred embodiments thereof with reference to the accompanying drawings, it is to be noted that various changes and modifications will become apparent to those skilled in the art.

For example, the side surface of the ultrasound oscillator 11 can be also provided with at least two of the flange portion 113, the protrusion portion 112, the concave portion 111 and the inclined portion, which are respectively engaged with the engagement portions (e.g., fixing member 117, recess portion 151 and the like) arranged at the housing portion 15 of the casing 1 as described above. Thus, the end surface of the ultrasound oscillator 11 can fixed contact the inner surface of the end portion 14 of the casing 1.

Such changes and modifications are to be understood as being in the scope of the present invention as defined by the appended claims.

What is claimed is:

1. An ultrasound sensor, comprising:
an ultrasound oscillator which is expandable and contractible in a thickness direction thereof; and
a casing which houses therein the ultrasound oscillator, an outer surface of an end portion of the casing fixedly contacting a mounting member, wherein:
the ultrasound oscillator has at least one of a protrusion portion, a concave portion and an inclined portion, through which one of two end surfaces of the ultrasound oscillator fixedly contacts an inner surface of the end portion of the casing,
the protrusion portion protruding outwards from a side surface of the ultrasound oscillator, the concave portion being recessed from the side surface, the inclined portion being arranged at the side surface and being inclined with respect to the thickness direction of the ultrasound oscillator,
the two end surfaces of the ultrasound oscillator intersecting the thickness direction of the ultrasound oscillator, the side surface of the ultrasound oscillator being substantially parallel with the thickness direction.

2. The ultrasound sensor according to claim 1, wherein
at least one of the protrusion portion, the concave portion and the inclined portion is arranged along at least a part of a circumference of the side surface of the ultrasound oscillator.

3. The ultrasound sensor according to claim 1, further comprising
a fixing member, wherein
the casing includes a housing portion which defines therein a space for housing the ultrasound oscillator, and the end portion which is positioned at an opening of the housing portion to substantially close the space; and
the fixing member is fixed to an inner surface of the housing portion and engaged with the concave portion arranged at the side surface of the ultrasound oscillator, in such a manner that the one of the two end surfaces of the ultrasound oscillator fixedly contacts the inner surface of the end portion of the casing.

4. The ultrasound sensor according to claim 1, wherein:
the casing includes a housing portion which defines therein a space for housing the ultrasound oscillator, and the end portion which is positioned at an opening of the housing portion to substantially close the space; and
the housing portion has a recess portion which is recessed from an inner surface of the housing portion, the recess portion being engaged with the protrusion portion of the side surface of the ultrasound oscillator, in such a manner that the one of the two end surfaces of the ultrasound oscillator fixedly contacts the inner surface of the end portion of the casing.

5. The ultrasound sensor according to claim 1, further comprising
a fixing member, wherein:
the casing includes a housing portion which defines therein a space for housing the ultrasound oscillator, and the end portion which is positioned at an opening of the housing portion to substantially close the space; and
the fixing member is fixed to an inner surface of the housing member and contacts the protrusion portion of the ultrasound oscillator, in such a manner that the protrusion portion is sandwiched between the fixing member and the inner surface of the end portion of the casing.

6. The ultrasound sensor according to claim 5, wherein
the protrusion portion of the ultrasound oscillator has a smaller thickness than the ultrasound oscillator.

7. The ultrasound sensor according to claim 1, wherein
the inclined portion of the ultrasound oscillator is tapered from a side of the one of the two end surfaces of the ultrasound oscillator toward a side of other of the two end surfaces, the one of the two end surfaces contacting the inner surface of the end portion of the casing.

8. The ultrasound sensor according to claim 7, further comprising
a fixing member, wherein:
the casing includes a housing portion which defines therein a space for housing the ultrasound oscillator, and the end portion which is positioned at an opening of the housing portion to substantially close the space; and
the fixing member is fixed to an inner surface of the housing member and contacts the inclined portion of the ultrasound oscillator, in such a manner that the one of the two end surfaces of the ultrasound oscillator fixedly contacts the inner surface of the end portion of the casing.

9. The ultrasound sensor according to claim 8, further comprising
a sound-absorbing member, which is constructed of a sound-absorbing material and arranged between the fixing member and the inclined portion.

10. The ultrasound sensor according to claim 1, further comprising
two electrodes, which are respectively attached to the two end surfaces of the ultrasound oscillator and positioned in the vicinity of a central axis of the ultrasound oscillator,
the central axis being parallel to the thickness direction of the ultrasound oscillator.

11. The ultrasound sensor according to claim 1, further comprising
an elastic member, wherein:
the casing includes a housing portion which defines therein a space for housing the ultrasound oscillator, and the end portion which is positioned at an opening of the housing portion to substantially close the space; and
the end portion of the casing is engaged with an inner surface of the housing portion through the elastic member.

12. The ultrasound sensor according to claim 1, wherein
the mounting member is a periphery member of a vehicle, and the outer surface of the end portion of the casing fixedly contacts a vehicle inner side surface of the periphery member.

13. An ultrasound sensor, comprising:
a substantially column-shaped ultrasound oscillator which is expandable and contractible in an axial direction thereof; and
a casing which has a housing portion and an end portion, the housing portion defining therein a space for housing the ultrasound oscillator, the end portion being positioned at an opening of the housing portion to substantially close the space, wherein
the ultrasound oscillator has at least one engagement portion, which is arranged at a side surface thereof and engaged with the housing portion in such a manner that one of two end surfaces of the ultrasound oscillator fixedly contacts an inner surface of the end portion of the casing, and
the engagement portion of the ultrasound oscillator is one of a protrusion portion which protrudes outwards from the side surface of the ultrasound oscillator, a concave portion which is recessed from the side surface, and an inclined portion which is arranged at the side surface and inclined with respect to the axial direction of the ultrasound oscillator.

* * * * *